Patented Feb. 17, 1931

1,792,943

UNITED STATES PATENT OFFICE

JOSEPH T. TERRY, OF LOS ANGELES, CALIFORNIA

METHOD OF MAKING TUNGSTEN-CARBIDE ALLOYS

No Drawing.    Application filed December 22, 1928.   Serial No. 328,059.

My invention relates to a method of making tungsten carbide. Tungsten carbide, either alone or alloyed with some of the highly refractory metals of its class, is used as a cutting medium particularly applicable to rock cutting and drilling tools. The tungsten carbide is ordinarily prepared by fusing the tungsten metal, usually in a finely comminuted state in a carbon crucible which is heated either by passing an electric current through the crucible or by means of an electric arc. The high temperatures thus produced, will fuse the tungsten and in its fused state will absorb carbon from the walls of the crucible, or in the case of the electric arc, from the carbon vapor of said arc. It is difficult to control the amount of carbon dissolved in or combined with the tungsten. The tungsten carbide should not have any free carbon which will be present in the form of graphite crystals, but all the carbon should be combined and should not ordinarily exceed 4%.

The object of the present invention is to prevent the formation of graphite tungsten crystals or free carbon in the tungsten carbide, thus preventing the formation of a tungsten alloy which is brittle and friable, and unsuitable for the cutting medium above mentioned, and always to insure a tungsten carbide which is of the required degree of density and toughness.

For this purpose I introduce an oxidizing agent in the mix, which will combine with the free carbon, thus preventing the formation of graphitic carbon, yet will allow the proper amount of carbon to combine with the tungsten.

My invention consists of the steps of the method hereinafter described and claimed.

I take tungsten, preferably in powdered form, and place the same in a carbon crucible cup-shape in form, which may be 2½" wide and 1" deep, using about ½ lb. of the tungsten metal. I add thereto tungsten oxide which may be up to 50% of the tungsten metal, and subject the same to an electric arc reaching a temperature of about 5000° F. for about two minutes. The carbon vapor of the electric arc will combine with the tungsten to form carbide, but the excess of carbon will be oxidized, combining with the oxygen of the tungsten oxide, forming carbon monoxide which will escape. The molten mass is now poured into molds, and will contain a tungsten carbide having a carbon content not to exceed approximately 4%.

In place of the tungsten oxide, I may use calcium oxide which will combine with the excess of the carbon and form calcium carbide and carbon monoxide. The calcium carbide will rise to the top of the molten metal as slag. The calcium oxide may be mixed with a metal charge, or it may be incorporated with the crucible container. The calcium oxide may be used in any desired amount, but an amount not to exceed 50% by weight of the metal charge is usually sufficient.

It is not essential that pure tungsten oxide be employed. Partially oxidized or roasted metal in pulverulent or solid form, may be used.

It will be understood that if desired, other highly refractory metals may be used to form an alloy with the tungsten. The present invention has for its object, merely the prevention of graphitic carbon.

In place of using singly, either the tungsten oxide or the calcium oxide as an oxidizing agent, I may use a mixture of the two in amount sufficient to prevent the formation of graphitic carbon.

Various changes in the steps of the method may be made by those skilled in the art, without departing from the spirit of my invention as claimed.

I claim:

A method of controlling the carbon content of a tungsten carbide alloy to prevent the formation of graphitic carbon, comprising adding calcium oxide to tungsten and fusing the mixture in a carbon crucible.

In testimony whereof I have signed my name to this specification.

JOSEPH T. TERRY.